(12) United States Patent
Yamanaka et al.

(10) Patent No.: US 6,226,192 B1
(45) Date of Patent: May 1, 2001

(54) THREE-LEVEL NEUTRAL POINT CLAMPING TYPE INVERTER CIRCUIT

(75) Inventors: Katsutoshi Yamanaka; Kenji Yamada; Akira Kumagae; Takaaki Terada, all of Fukuoka (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 09/529,514
(22) PCT Filed: Oct. 27, 1998
(86) PCT No.: PCT/JP98/04864
   § 371 Date: Apr. 14, 2000
   § 102(e) Date: Apr. 14, 2000
(87) PCT Pub. No.: WO99/22440
   PCT Pub. Date: May 6, 1999

(30) Foreign Application Priority Data

Oct. 28, 1997 (JP) .................................................. 9-295560

(51) Int. Cl.$^7$ .................................................. H02H 7/122
(52) U.S. Cl. .................................................. 363/56.01; 363/132
(58) Field of Search .................................................. 363/17, 52, 53, 363/58, 55, 56, 125, 127, 131, 132, 97, 98; 361/58, 111, 118

(56) References Cited

U.S. PATENT DOCUMENTS 4,881,159  11/1989  Holtz et al. .............................. 363/58

5,953,222 * 9/1999 Mizutani .................................. 363/56

FOREIGN PATENT DOCUMENTS

| 1-198280 | 8/1989 | (JP) . |
| 7-135781 | 5/1995 | (JP) . |
| 7-312878 | 11/1995 | (JP) . |
| 8-294285 | 11/1996 | (JP) . |

* cited by examiner

*Primary Examiner*—Edward H. Tso
*Assistant Examiner*—Gary L. Laxton
(74) *Attorney, Agent, or Firm*—Morgan, Lewis & Bockius LLP

(57) ABSTRACT

In a three-level neutral point clamping type inverter circuit which includes a positive bus line (4), a negative bus line (5) and a neutral line (6), wherein first and second IGBTs (11), (12) are connected in series between the positive bus line (4) and a phase voltage output terminal (10) and third and fourth IGBTs (13), (14) are connected in series between the negative bus line (5) and the phase voltage output terminal (10), the three-level neutral point clamping type inverter circuit further includes a first snubber capacitor (21) provided between the positive bus line (4) and the neutral line (6), a second snubber capacitor (22) provided between the negative bus line (5) and the neutral line (6), a first snubber diode (23) having a cathode coupled to the positive bus line (4) and an anode coupled to the phase voltage output terminal (10), and a second snubber diode (24) having an anode coupled to the negative bus line (5) and a cathode coupled to the phase voltage output terminal (10).

2 Claims, 6 Drawing Sheets

THREE-LEVEL NEUTRAL POINT CLAMPING TYPE INVERTER CIRCUIT

TECHNICAL FIELD

The present invention relates to a neutral point clamping type inverter circuit forming a power conversion apparatus which performs a variable speed driving operation and an inter-system interlink operation or the like for a motor.

BACKGROUND ART

As a snubber circuit for a neutral point clamping type inverter circuit, an individual snubber circuit type has been employed in general in which a snubber circuit is provided at each of respective switching elements, as disclosed in Japanese Patent Unexamined Publication No. Hei 7-135781 and Japanese Patent Unexamined Publication No. Hei 8-294285.

Japanese Patent Unexamined Publication No. Hei 7-135781 discloses a control method wherein a snubber circuit formed by a resistor, a capacitor and a diode is provided at each of respective switching elements so that an inverter can be stopped without breaking the switching element due to the excessive voltage or the like applied thereto.

Japanese Patent Unexamined Publication No. Hei 8-294285 discloses a technique wherein a snubber circuit formed by a resistor, a capacitor and a diode is provided at each of respective switching elements and each of the snubber circuits is formed as a voltage clamping type snubber circuit to which a half of the power source voltage is applied thereby to reduce the loss of the snubber circuit.

However, in the case of providing a snubber circuit at a neutral point clamping type inverter circuit of a relatively middle or small capacity, if the individual snubber circuit type having a snubber circuit at each of the switching elements is employed, there arises a problem that the number of parts becomes large and the cost of the snubber circuits becomes expensive.

Therefore, an object of the present invention is to provide a three-level neutral point clamping type inverter circuit wherein the snubber circuits are formed by a smaller number of parts

DISCLOSURE OF THE INVENTION

A three-level neutral point clamping type inverter circuit according to the present invention includes a positive bus line, a negative bus line and a neutral line, wherein a plurality of switching elements are connected in series between the positive bus line and a phase voltage output terminal and a plurality of switching elements are connected in series between the negative bus line and the phase voltage output terminal, the three-level neutral point clamping type inverter circuit further includes:

a first snubber capacitor provided between the positive bus line and the neutral line;

a second snubber capacitor provided between the negative bus line and the neutral line;

a first snubber diode having a cathode coupled to the positive bus line and an anode coupled to the phase voltage output terminal; and a second snubber diode having an anode coupled to the negative bus line and a cathode coupled to the phase voltage output terminal.

A three-level neutral point clamping type inverter circuit according to the present invention includes a positive bus line, a negative bus line and a neutral line, wherein a plurality of switching elements are connected in series between the positive bus line and a phase voltage output terminal and a plurality of switching elements are connected in series between the negative bus line and the phase voltage output terminal, the three-level neutral point clamping type inverter circuit further includes:

a first RCD snubber circuit having a first diode whose anode is coupled to the positive bus line, a first snubber capacitor coupled between a cathode of the first diode and the neutral line, and a first discharge resistor coupled in parallel to the first diode;

a second RCD snubber circuit having a second diode whose cathode is coupled to the negative bus line, a second snubber capacitor coupled between an anode of the second diode and the neutral line, and a second discharge resistor coupled in parallel to the second diode;

a first snubber diode having a cathode coupled to a connection point between the first diode of the first RCD snubber circuit and the first snubber capacitor and having an anode coupled to the phase voltage output terminal; and a second snubber diode having an anode coupled to a connection point between the second diode of the second RCD snubber circuit and the second snubber capacitor and having a cathode coupled to the phase voltage output terminal.

According to the present invention, in a three-level neutral point clamping type inverter circuit which includes a positive bus line, a negative bus line and a neutral line, wherein a plurality of switching elements are connected in series between the positive bus line and a phase voltage output terminal and a plurality of switching elements are connected in series between the negative bus line and the phase voltage output terminal, the three-level neutral point clamping type inverter circuit is not arranged in a manner that a snubber circuit is provided at each of the respective switching elements but arranged in a manner that first and second snubber capacitors or first and second RCD snubber circuits are provided between the positive/negative bus line and the neutral line, and further first and second snubber diodes are provided between the positive/negative bus line and the phase voltage output terminal or between the first and second RCD snubber circuits and the phase voltage output terminal, whereby the snubber circuits can be formed by smaller number of parts. Accordingly, the snubber circuits can be provided within a three-level neutral point clamping type inverter circuit of a relatively middle or small capacity without increasing cost largely and further the quality of the inverter circuit can be improved. Further, the increase of the size of the inverter apparatus can be suppressed.

BEST MODES FOR CARRYING OUT THE INVENTION

The embodiments according to the present invention will be explained hereinafter with reference to the accompany drawings.

Figure 1:
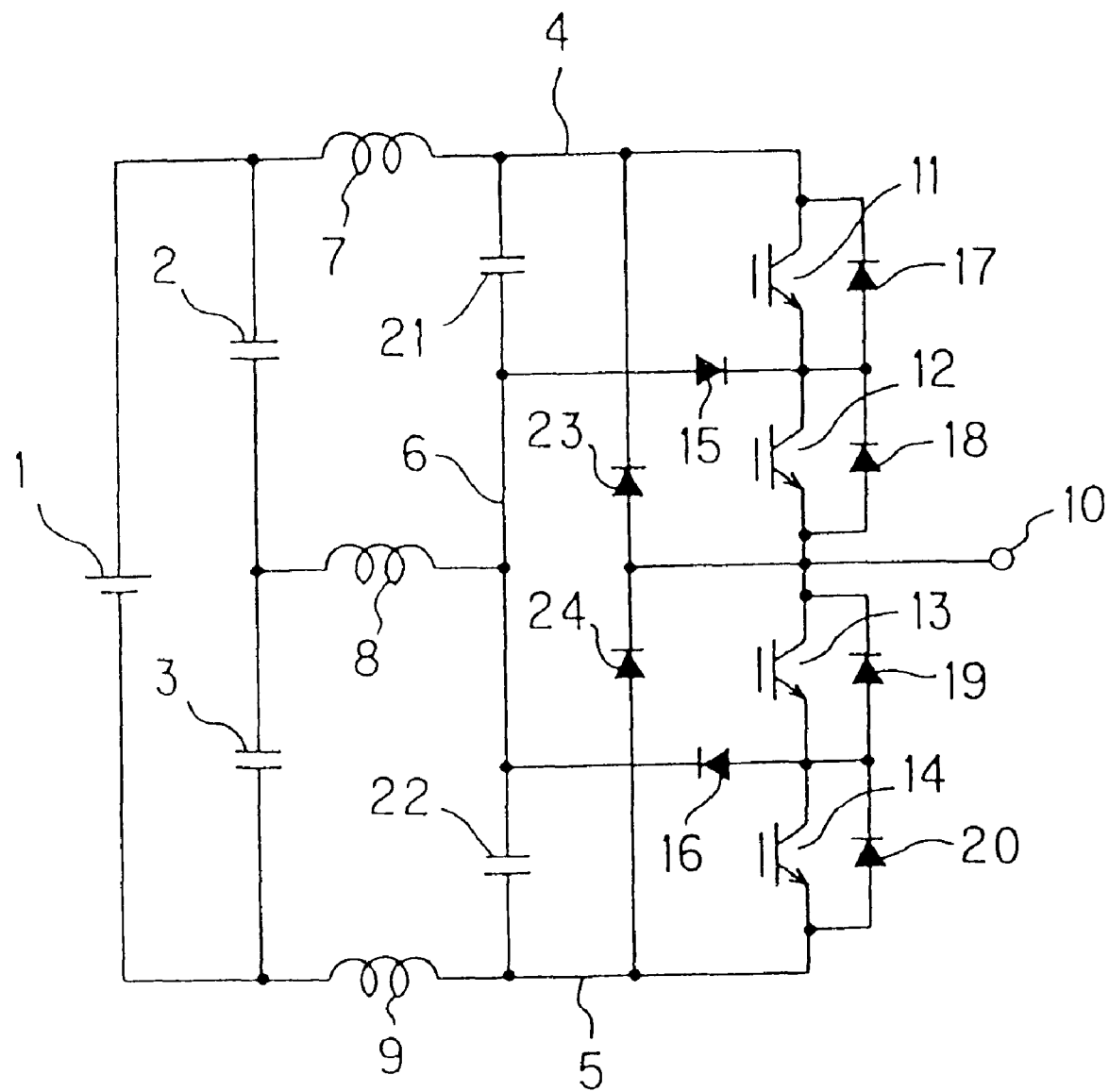
FIG. 1 is a circuit diagram showing an inverter circuit of one-phase according to the first embodiment of the present invention.
Figure 2A:
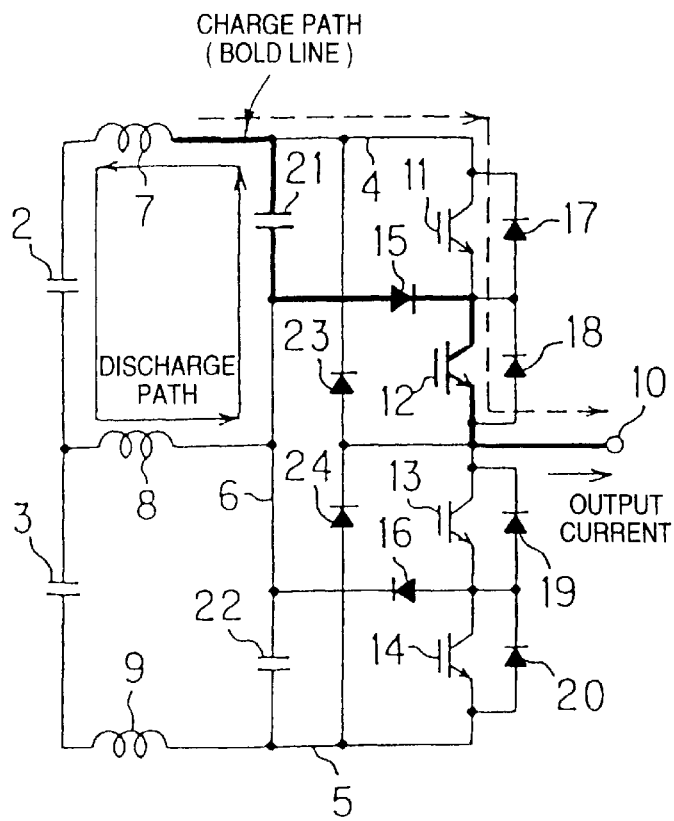
FIG. 2 is a circuit diagram used for explaining the snubber operation of the inverter circuit shown in FIG. 1, wherein (a) of FIG. 2 is a circuit diagram for explaining the process from on states of first and second IGBTs to an off state of the first IGBT, (b) of FIG. 2 is a circuit diagram for explaining the process from on states of the second and third IGBTs to an off state of the second IGBT, (c) of FIG. 2 is a circuit diagram for explaining the process from on states of the third and fourth IGBTs to an off state of the fourth IGBT, and (d) of FIG. 2 is a circuit diagram for explaining the process from on states of the second and third IGBTs to an off state of the third IGBT.
Figure 2B:
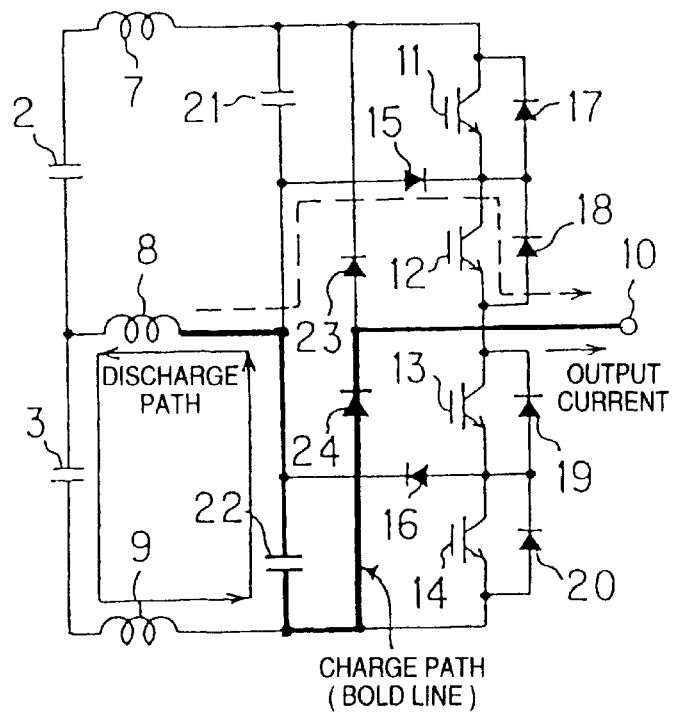
Figure 2C:
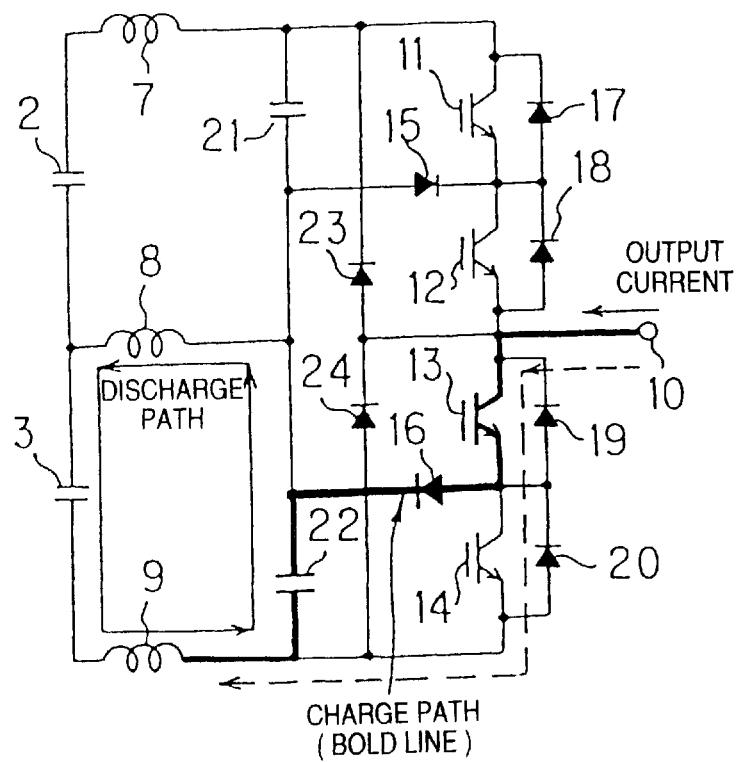
Figure 2D:
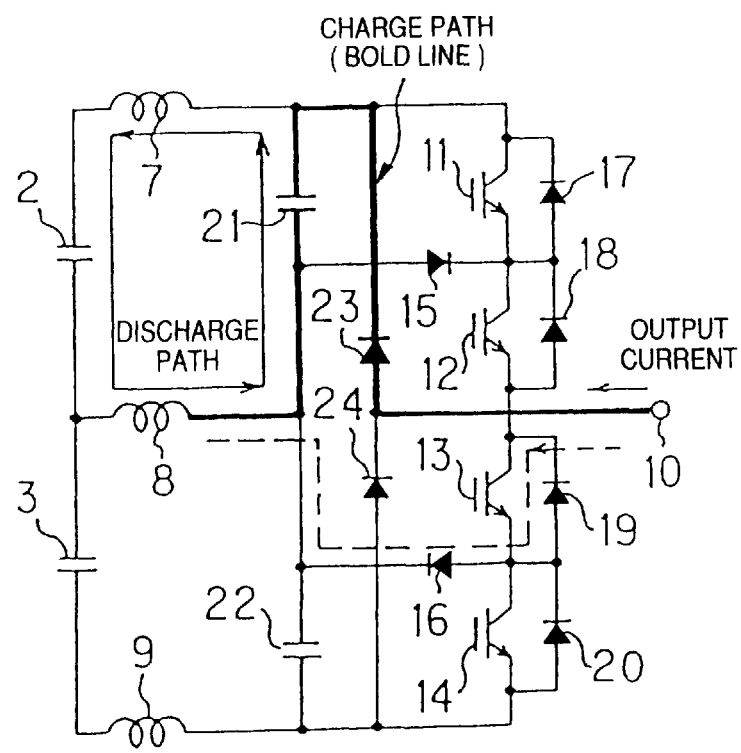

FIG. 1 is a circuit diagram showing a three level neutral point clamping type inverter circuit of one-phase according to the embodiment of the present invention. In the figure, a series circuit of a smoothing capacitor 2 and a smoothing capacitor 3 is connected in parallel with a power source 1. Reactance components of a positive bus line 4, a negative bus line 5 and a neutral line 6 are clearly shown as reactors 7, 8 and 9, respectively. A first IGBT (insulated-gate bipolar transistor) 11 and a second IGBT 12 each forming a switching element are connected in series between the positive bus line 4 and a phase voltage output terminal 10. In the similar manner, a third IGBT 13 and a fourth IGBT 14 each forming a switching element are connected in series between the negative bus line 5 and the phase voltage output terminal 10. Further, one clamping diode 15 is provided in a manner that the cathode thereof is connected to the connection point between the first IGBT 11 and the second IGBT 12 and the anode thereof is connected to the neutral line 6. The other clamping diode 16 is provided in a manner that the anode thereof is connected to the connection point between the third IGBT 13 and the fourth IGBT 14 and the cathode thereof is connected to the neutral line 6. A first flywheel diode 17, a second flywheel diode 18, a third flywheel diode 19 and a fourth flywheel diode 20 are connected in parallel with the IGBTs 11, 12, 13 and 14, respectively.

In such an inverter circuit, according to the present invention, a first snubber capacitor 21 is connected between the positive bus line 4 and the neutral line 6 and a second snubber capacitor 22 is connected between the negative bus line 5 and the neutral line 6. Further, a first snubber diode 23 is provided in a manner that the cathode thereof is connected to the positive bus line 4 and the anode thereof is connected to the phase voltage output terminal 10, and a second snubber diode 24 is provided in a manner that the anode thereof is connected to the negative bus line and the cathode thereof is connected to the phase voltage output terminal. According to such an arrangement, the inverter circuit is provided with the snubber function. (a), (b), (c) and (d) of FIG. 2 are diagrams showing the operations of the inverter circuit of FIG. 1. In these drawings, the reactance components contained in the wirings from the smoothing capacitors 2, 3 to the IGBTs 11, 12, 13, 14 are represented as the reactors 7, 8, 9. The main cause of the serge generated at the IGBTs forming the switching elements is the presence of the reactance components contained in the wirings.

In (a) of FIG. 2, in the case where the current flows through a path shown by a dotted line in a condition that the first and second IGBTs 11 and 12 are in an on state and the third and fourth IGBTs 13 and 14 are in an off state, when the first IGBT 11 turns off, the electric energy stored in the reactor 7 is released through a path shown by a bold line in (a) of FIG. 2 thereby to charge the first snubber capacitor 21. When the energy stored in the reactor 7 has been shifted to the first snubber capacitor 21, the current path shown by the bold line is cut off and the current starts flowing from the neutral line 6 to the phase voltage output terminal 10 through the one clamping diode 15 and the second IGBT 12. Further, the surplus energy stored as electric charges in the first snubber capacitor 21 is released toward the smoothing capacitor 2.

In (b) of FIG. 2, in the case where the current flows through a path shown by a dotted line in a condition that the second and third IGBTs 12 and 13 are in an on state and the first and fourth IGBTs 11 and 14 are in an off state, when the second IGBT 12 turns off, the electric energy stored in the reactor 8 is released through a path shown by a bold line in (b) of FIG. 2 thereby to charge the second snubber capacitor 22. When the energy stored in the reactor 8 has been shifted to the second snubber capacitor 22, the current path shown by the bold line is cut off and the current starts flowing from the negative electrode side of the smoothing capacitor 3 to the phase voltage output terminal 10 through the second snubber diode 24. Thus, the circulation current of the inverter circuit does not flow through the third and fourth flywheel diodes 19 and 20 but flows through the second snubber diode 24, so that the second snubber diode 24 is required to have a current capacity almost same as that of the third and fourth IGBTs 13 and 14. Further, the surplus energy stored as electric charges in the second snubber capacitor 22 is released toward the smoothing capacitor 3.

In (c) of FIG. 2, in the case where the current flows through a path shown by a dotted line in a condition that the third and fourth IGBTs 13 and 14 are in an on state and the first and second IGBTs 11 and 12 are in an off state, when the fourth IGBT 14 turns off, the electric energy stored in the reactor 9 is released through a path shown by a bold line in (c) of FIG. 2 thereby to charge the second snubber capacitor 22. When the energy stored in the reactor 9 has been shifted to the second snubber capacitor 22, the current path shown by the bold line is cut off and the current starts flowing to the neutral line through the third IGBT 13 and the other clamping diode 16. Further, the surplus energy stored as electric charges in the second snubber capacitor 22 is released toward the smoothing capacitor 3.

In (d) of FIG. 2, in the case where the current flows through a path shown by a dotted line in a condition that the second and third IGBTs 12 and 13 are in an on state and the first and fourth IGBTs 11 and 14 are in an off state, when the third IGBT 13 turns off, the electric energy stored in the reactor 8 is released through a path shown by a bold line in (d) of FIG. 2 thereby to charge the first snubber capacitor 21. When the energy stored in the reactor 8 has been released, the current path shown by the bold line is cut off and the current starts flowing to the positive electrode side of the smoothing capacitor 2 through the first snubber diode 23. Thus, the circulation current of the inverter circuit does not flow through the first and second flywheel diodes 17 and 18 but flows through the first snubber diode 23, so that the first snubber diode 23 is also required to have a current capacity almost same as that of the first and second IGBTs 11 and 12. Further, the surplus energy stored as electric charges in the first snubber capacitor 21 is released toward the smoothing capacitor 2.

The second embodiment according to the present invention will be explained hereinafter with reference to FIG. 3.

Figure 3:
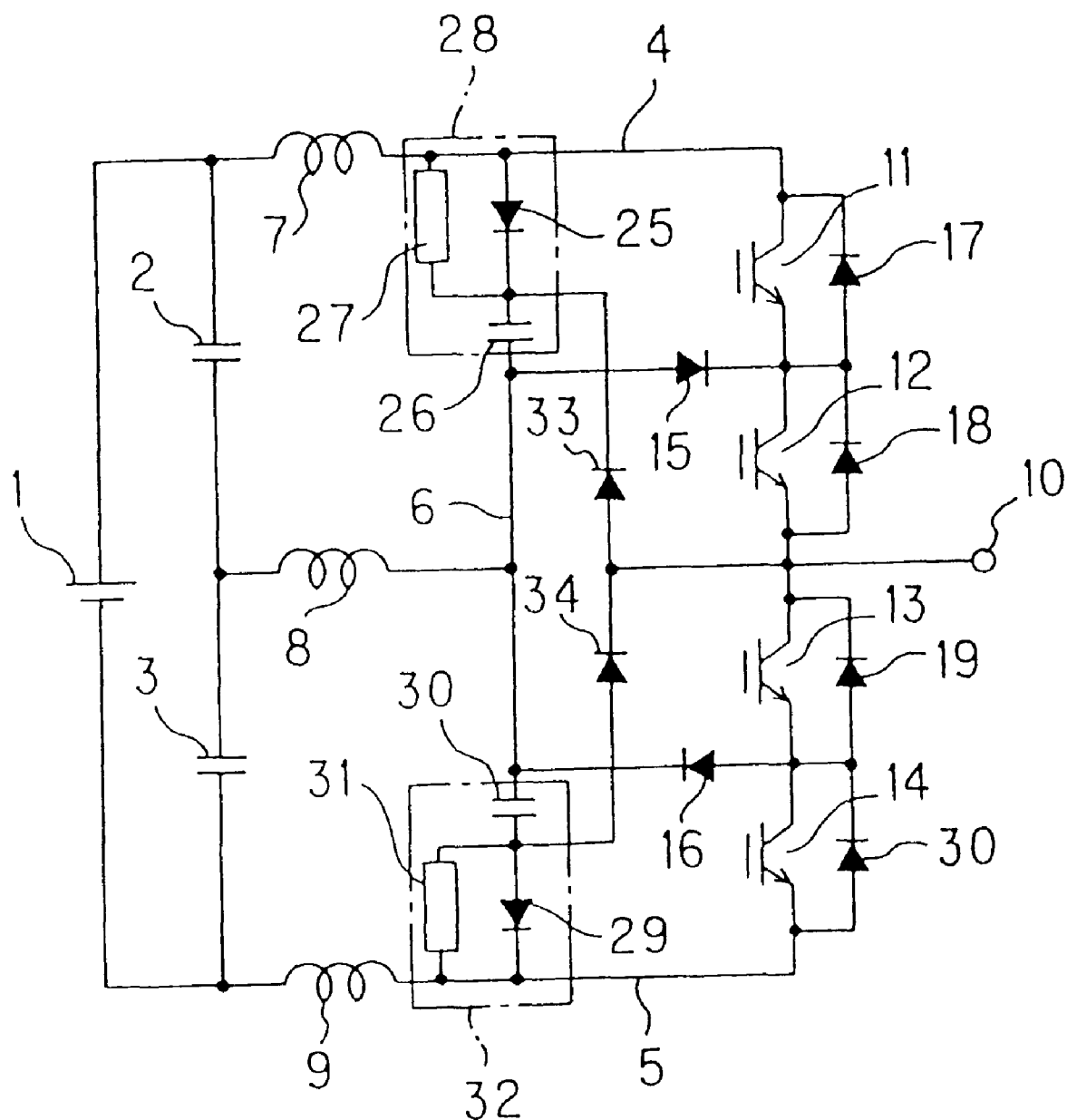
FIG. 3 is a circuit diagram showing an inverter circuit of one-phase according to the second embodiment of the present invention.
Figure 4A:
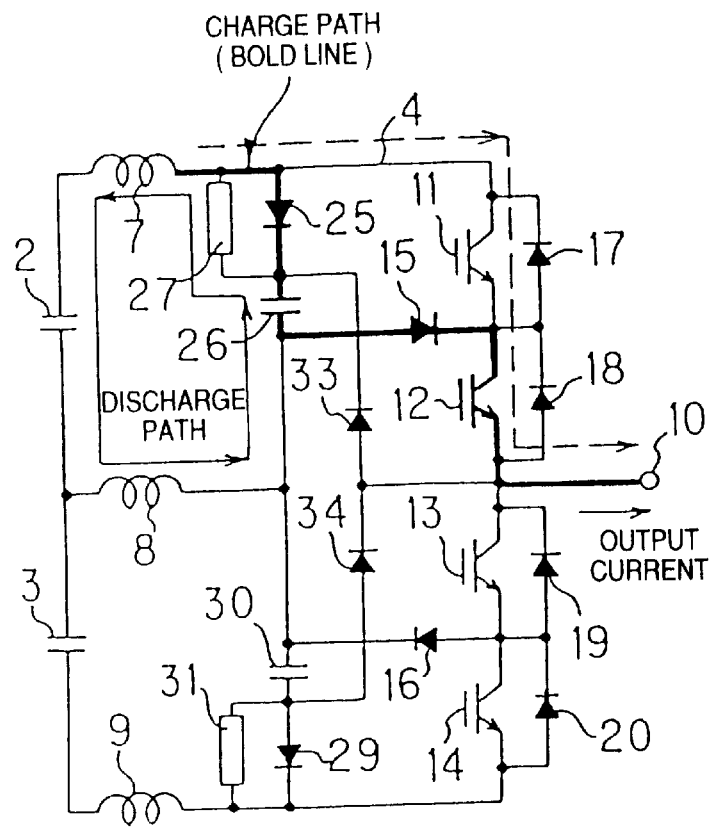
FIG. 4 is a circuit diagram used for explaining the snubber operation of the inverter circuit shown in FIG. 3, wherein (a) of FIG. 4 is a circuit diagram for explaining the process from on states of first and second IGBTs to an off state of the first IGBT, (b) of FIG. 4 is a circuit diagram for explaining the process from on states of the second and third IGBTs to an off state of the second IGBT, (c) of FIG. 4 is a circuit diagram for explaining the process from on states of the third and fourth IGBTs to an off state of the fourth IGBT, and (d) of FIG. 4 is a circuit diagram for explaining the process from on states of the second and third IGBTs to an off state of the third IGBT.
Figure 4B:
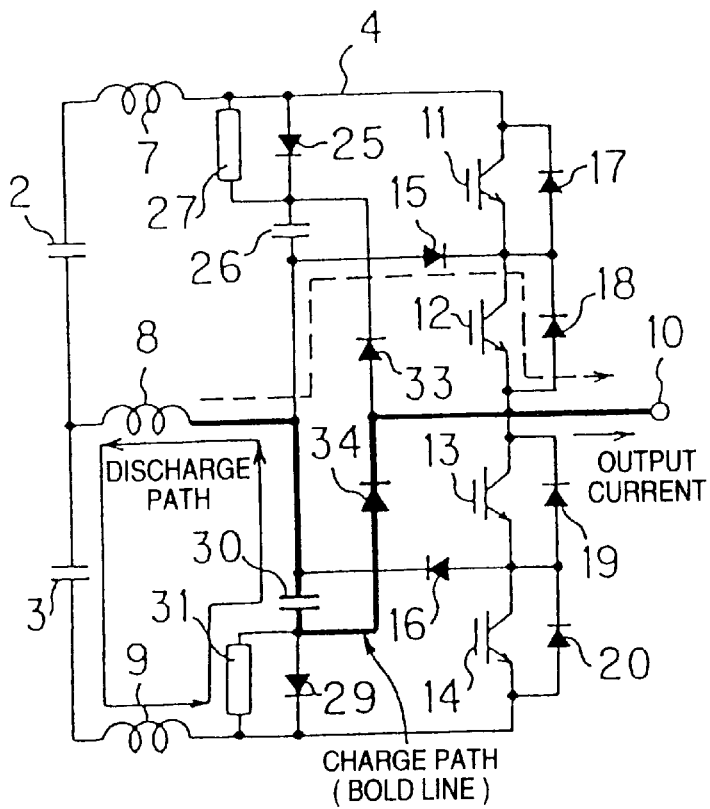
Figure 4C:
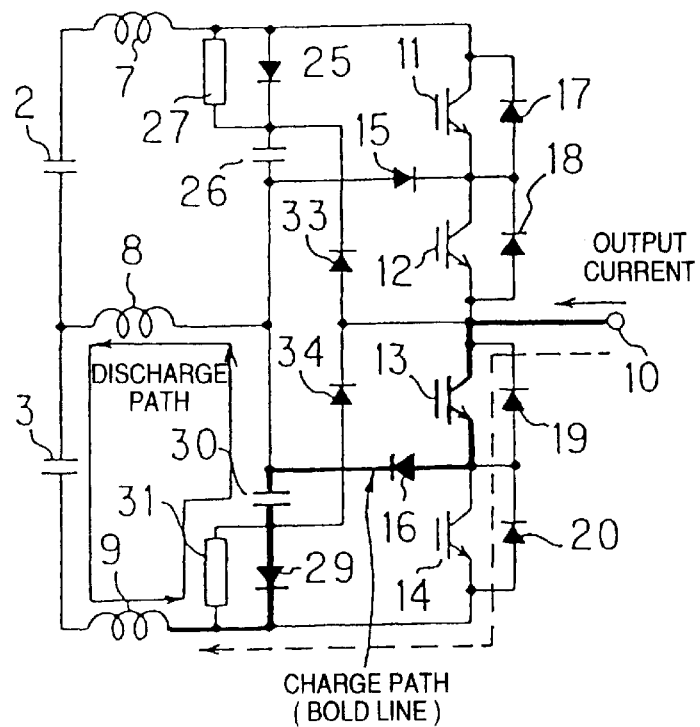
Figure 4D:
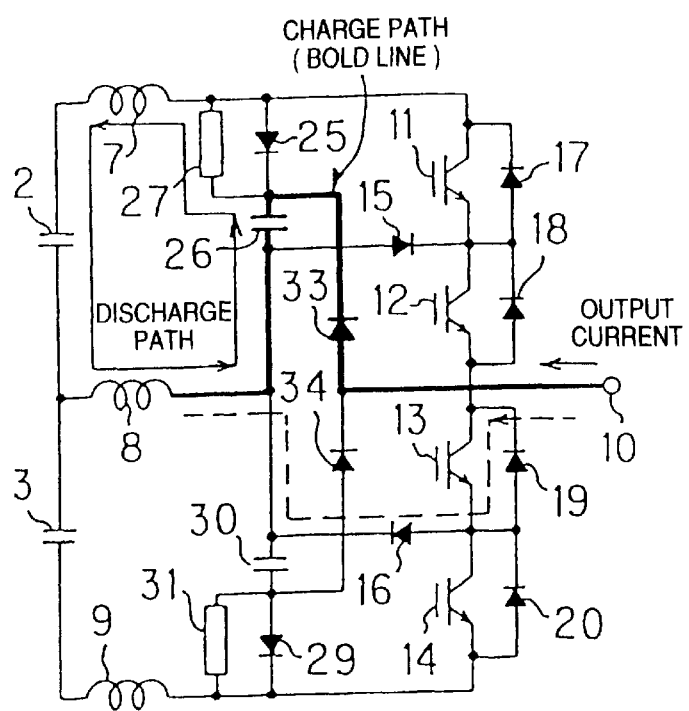

FIG. 3 is a circuit diagram showing a three level neutral point clamping type inverter circuit of one-phase according to the embodiment of the present invention. In the figure, the same portions as those of FIG. 1 are represented by the same reference numerals as FIG. 1. In the figure, a series circuit of a smoothing capacitor 2 and a smoothing capacitor 3 is connected in parallel with a power source 1. Reactance components of a positive bus line 4, a negative bus line 5 and a neutral line 6 are clearly shown as reactors 7, 8 and 9, respectively. A first IGBT 11 and a second IGBT 12 each forming a switching element are connected in series between the positive bus line 4 and a phase voltage output terminal 10. In the similar manner, a third IGBT 13 and a fourth IGBT 14 each forming a switching element are connected in series between the negative bus line 5 and the phase voltage output terminal 10. Further, one clamping diode 15 is provided in a manner that the cathode thereof is connected to the connection point between the first IGBT 11 and the second IGBT 12 and the anode thereof is connected to the neutral line 6. The other clamping diode 16 is provided in a manner that the anode thereof is connected to the connection point between the third IGBT 13 and the fourth IGBT 14 and the cathode thereof is connected to the neutral line 6. A first flywheel diode 17, a second flywheel diode 18, a third flywheel diode 19 and a fourth flywheel diode 20 are connected in parallel with the IGBTs 11, 12, 13 and 14, respectively.

In the inverter circuit thus configured, according to the present invention, there is provided with a first RCD snubber circuit 28 which is arranged in a manner that a first snubber capacitor 26 is connected between the neutral line 6 and the cathode of the first diode 25 whose anode is connected to the positive bus line 4 and a first discharge register 27 is connected in parallel with the first diode 25. Further, a second RCD snubber circuit 32 is provided which is arranged in a manner that a second snubber capacitor 30 is connected between the neutral line 6 and the anode of the second diode 29 whose cathode is connected to the negative bus line 5 and a second discharge register 31 is connected in parallel with the second diode 29. Furthermore, a first snubber diode 33 is provided in a manner that the anode thereof is connected to the phase voltage output terminal 10 and the cathode thereof is connected to the connection point between the first diode 25 of the first RCD snubber circuit 28 and the first snubber capacitor 26, and a second snubber diode 34 is provided in a manner that the cathode thereof is connected to the phase voltage output terminal 10 and the anode thereof is connected to the connection point between the second diode 29 of the second RCD snubber circuit 32 and the second snubber capacitor 30.

Next, the snubber operation of the inverter circuit according to this embodiment will be explained with reference to FIG. 4. FIG. 4 shows the operations of the inverter circuit of FIG. 3. In the figure, the reactance components contained in the wirings from the smoothing capacitors 2, 3 to the IGBTs 11, 12, 13, 14 are clearly represented as the reactors 7, 8, 9. The main cause of the serge generated at the IGBTs forming the switching elements is the presence of the reactance components contained in the wirings.

In (a) of FIG. 4, in the case where the current flows through a path shown by a dotted line in a condition that the first and second IGBTs 11 and 12 are in an on state and the third and fourth IGBTs 13 and 14 are in an off state, when the first IGBT 11 turns off, the electric energy stored in the reactor 7 is released through a path shown by a bold line in (a) of FIG. 4 thereby to charge the first snubber capacitor 26. When the energy stored in the reactor 7 has been shifted to the first snubber capacitor 26, the current path shown by the bold line is cut off and the current starts flowing from the neutral line 6 to the phase voltage output terminal 10 through the first clamping diode 15 and the second IGBT 12. Further, the energy stored as electric charges in the first snubber capacitor 26 is released toward the smoothing capacitor 2 through a discharge path including the first discharge register 27 shown in the figure during the period where the first snubber capacitor 26 is not in a charging state. In this discharge, since the connection of the inverter circuit is performed in the form of the neutral point clamping type, the voltage between the both terminals of the first snubber capacitor 26 is discharged only to the level substantially same as the voltage between the both terminals of the smoothing capacitor 2, and so the voltage between the both terminals of the first snubber capacitor 26 does not become zero. Thus, the inverter circuit according to this embodiment can suppress the amount of loss caused by the surge to the level lower than that caused in the snubber circuit of the type where the voltage between the both terminals of the first snubber capacitor 26 becomes zero.

In (b) of FIG. 4, in the case where the current flows through a path shown by a dotted line in a condition that the second and third IGBTs 12 and 13 are in an on state and the first and fourth IGBTs 11 and 14 are in an off state, when the second IGBT 12 turns off, the electric energy stored in the reactor 8 is released through a path shown by a bold line in (b) of FIG. 4 thereby to charge the second snubber capacitor 30. When the energy stored in the reactor 8 has been shifted to the second snubber capacitor 30, the current path shown by the bold line is cut off and the current starts flowing from the negative electrode side of the smoothing capacitor 3 through the fourth flywheel diode 20 and the third flywheel diode 19. The energy stored as electric charges in the second snubber capacitor 30 is released toward the smoothing capacitor 3 through a discharge path including the second discharge register 31 shown in the figure during the period where the second snubber capacitor 30 is not in a charging state In this discharge, also, due to the connection type of the inverter, the voltage between the both terminals of the second snubber capacitor 30 is discharged only to the level substantially same as the voltage between the both terminals of the smoothing capacitor 3, and so the voltage between the both terminals of the second snubber capacitor 30 does not become zero. Thus, also in this case, the inverter circuit according to this embodiment can suppress the amount of loss caused by the surge to the level lower than that caused in the snubber circuit of the type where the voltage between the both terminals of the second snubber capacitor 30 becomes zero.

In (c) of FIG. 4, in the case where the current flows through a path shown by a dotted line in a condition that the third and fourth IGBTs 13 and 14 are in an on state and the first and second IGBTs 11 and 12 are in an off state, when the fourth IGBT 14 turns off, the electric energy stored in the reactor 9 is released through a path shown by a bold line in (c) of FIG. thereby to charge the second snubber capacitor 30. When the energy stored in the reactor 9 has been shifted to the second snubber capacitor 30, the current path shown by the bold line is cut off and the current starts flowing through the third IGBT 13, the second clamping diode 16 and the neutral line 6. Further, the energy stored as electric charges in the second snubber capacitor 30 is released toward the smoothing capacitor 3 through a discharge path including the second discharge register 31 shown in the figure during the period where the second snubber capacitor 30 is not in a charging state. In this discharge, also, due to the connection type of the inverter, the voltage between the both terminals of the second snubber capacitor 30 is discharged only to the level substantially same as the voltage between the both terminals of the smoothing capacitor 3, and so the voltage between the both terminals of the second snubber capacitor 30 does not become zero. Thus, also in this case, the inverter circuit according to this embodiment can suppress the amount of loss caused by the surge to the level lower than that caused in the snubber circuit of the type where the voltage between the both terminals of the second snubber capacitor 30 becomes zero.

In (d) of FIG. 4, in the case where the current flows through a path shown by a dotted line in a condition that the second and third IGBTs 12 and 13 are in an on state and the first and fourth IGBTs 11 and 14 are in an off state, when the third IGBT 13 turns off, the electric energy stored in the reactor 8 is released through a path shown by a bold line in (d) of FIG. 4 thereby to charge the first snubber capacitor 26. When the energy stored in the reactor 8 has been shifted to the first snubber capacitor 26, the current path shown by the bold line is cut off and the current starts flowing through the second flywheel diode 18, the first flywheel diode 17 and the positive electrode of the smoothing capacitor 2. Further, the energy stored as electric charges in the first snubber capacitor 26 is released toward the smoothing capacitor 2 through a discharge path including the first discharge register 27 shown in the figure during the period where the first snubber capacitor 26 is not in a charging state. In this discharge, also, due to the connection type of the inverter, the voltage between the both terminals of the first snubber capacitor 26 is discharged only to the level substantially same as the voltage between the both terminals of the smoothing capacitor 2, and so the voltage between the both terminals of the first snubber capacitor 26 does not become zero. Thus, also in this case, the inverter circuit according to this embodiment can suppress the amount of loss caused by the surge to the level lower than that caused in the snubber circuit of the type where the voltage between the both terminals of the first snubber capacitor 26 becomes zero.

What is claimed is:

1. In a three-level neutral point clamping type inverter circuit which includes a positive bus line, a negative bus line and a neutral line, wherein a plurality of switching elements are connected in series between said positive bus line and a phase voltage output terminal and a plurality of switching elements are connected in series between said negative bus line and said phase voltage output terminal, said three-level neutral point clamping type inverter circuit is characterized by comprising:

a first snubber capacitor provided between said positive bus line and said neutral line;

a second snubber capacitor provided between said negative bus line and said neutral line;

a first snubber diode having a cathode coupled to said positive bus line and an anode coupled to said phase voltage output terminal; and a second snubber diode having an anode coupled to said negative bus line and a cathode coupled to said phase voltage output terminal, wherein said first snubber capacitor has a first terminal directly connected to said neutral line and said second snubber capacitor has a first terminal directly connected to said neutral line.

2. In a three-level neutral point clamping type inverter circuit which includes a positive bus line, a negative bus line and a neutral line, wherein a plurality of switching elements are connected in series between said positive bus line and a phase voltage output terminal and a plurality of switching elements are connected in series between said negative bus line and said phase voltage output terminal, said three-level neutral point clamping type inverter circuit is characterized by comprising:

a first RCD snubber circuit having a first diode whose anode is coupled to said positive bus line, a first snubber capacitor coupled between a cathode of said first diode and said neutral line, and a first discharge resistor coupled in parallel to said first diode;

a second RCD snubber circuit having a second diode whose cathode is coupled to said negative bus line, a second snubber capacitor coupled between an anode of said second diode and said neutral line, and a second discharge resistor coupled in parallel to said second diode;

a first snubber diode having a cathode coupled to a connection point between said first diode of said first RCD snubber circuit and said first snubber capacitor and having an anode coupled to said phase voltage output terminal; and a second snubber diode having an anode coupled to a connection point between said second diode of said second RCD snubber circuit and said second snubber capacitor and having a cathode coupled to said phase voltage output terminal.

* * * * *